United States Patent
Kang et al.

(10) Patent No.: US 9,501,181 B2
(45) Date of Patent: Nov. 22, 2016

(54) TOUCH SCREEN PANEL

(71) Applicant: Samsung Display Co., Ltd., Yongin, Gyeonggi-do (KR)

(72) Inventors: Sung-Ku Kang, Yongin (KR); Hak-Sun Kim, Yongin (KR); Tae-Hyeog Jung, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 218 days.

(21) Appl. No.: 13/928,194

(22) Filed: Jun. 26, 2013

(65) Prior Publication Data

US 2014/0210766 A1    Jul. 31, 2014

(30) Foreign Application Priority Data

Jan. 25, 2013  (KR) ........................ 10-2013-0008857

(51) Int. Cl.
*G06F 3/041* (2006.01)
*G06F 3/045* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ............ G06F 3/044; G06F 2203/04111; G06F 2203/0407; G06F 3/041
USPC ................................................. 345/173–174
See application file for complete search history.

(56) References Cited

U.S. PATENT DOCUMENTS

| | | | |
|---|---|---|---|
| 7,663,067 B2 | 2/2010 | Hayakawa et al. | |
| 7,920,129 B2 | 4/2011 | Hotelling et al. | |
| 8,217,902 B2 | 7/2012 | Chang et al. | |
| 2008/0309635 A1 | 12/2008 | Matsuo | |
| 2011/0050625 A1 | 3/2011 | Kim et al. | |
| 2011/0227858 A1* | 9/2011 | An et al. | 345/174 |
| 2012/0169628 A1* | 7/2012 | Kuo | G06F 3/044 345/173 |
| 2013/0155000 A1* | 6/2013 | Trend | G06F 3/044 345/174 |
| 2014/0009428 A1* | 1/2014 | Coulson et al. | 345/174 |
| 2014/0062934 A1* | 3/2014 | Coulson et al. | 345/174 |

FOREIGN PATENT DOCUMENTS

| | | |
|---|---|---|
| KR | 10-2008-0110477 A | 12/2008 |
| KR | 10-2011-0022269 A | 3/2011 |
| KR | 10-2011-0100872 A | 9/2011 |

* cited by examiner

*Primary Examiner* — Amit Chatly
(74) *Attorney, Agent, or Firm* — Knobbe Martens Olson & Bear LLP

(57) ABSTRACT

A touch screen panel includes a substrate comprising a major surface and divided into an active area and a non-active area when viewed in a viewing direction perpendicular to the major surface; a plurality of driving electrodes formed over the active area of the substrate and generally arranged along a first direction; a plurality of first sensing electrodes formed over the active area of the substrate and generally arranged along a second direction; and a plurality of second sensing electrodes formed over the active area of the substrate and arranged along the second direction. The shapes of the first sensing electrode and the second sensing electrode are different from each other.

16 Claims, 3 Drawing Sheets

TOUCH SCREEN PANEL

CROSS-REFERENCE TO RELATED APPLICATION

This application claims priority to and the benefit of Korean Patent Application No. 10-2013-0008857, filed on Jan. 25, 2013, in the Korean Intellectual Property Office, the entire content of which is incorporated herein by reference.

BACKGROUND

1. Field

The present disclosure relates to a touch screen panel, and more particularly, to a capacitive type touch screen panel.

2. Discussion of the Related Technology

A touch screen panel is an input device capable of inputting a user's command by selecting instructions displayed on a screen, such as an image display device, or the like, with his/her hand or an object.

To this end, the touch screen panel is provided to a front face of the image display device and converts a contact position which is directly contacted with his/her hand or an object into a electrical signal. Therefore, the instruction contents selected at the contact position are recognized as input signal.

Since the touch panel screen as described above may substitute a separate input device such as a keyboard, a mouse which are connected to the image display device and operated, it has gradually been widely used.

As a type of implementing the touch screen panel, a resistive type, an optical sensing type, a capacitive type, and the like, are known. Among them, the capacitive type touch screen panel converts a contact position into a electrical signal, when the conductive sensing cells sense a change in the capacitance formed other adjacent sensing cells by contacting the panel with a user's hand or object, such as a stylus pen.

SUMMARY

An aspect of the present invention provides a mutual capacitive type touch screen panel capable of improving a touch recognizing sensitivity to secure a plurality of sensing signals to the same driving signals by including driving electrodes arranged in a first direction and a plurality of sensing electrodes which are arranged in intersecting direction with the first direction and are formed to have at least two different shapes, and implementing one sensing set of one of the driving electrodes and the adjacent sensing electrodes having different shapes from each other.

One aspect of the invention provides a touch screen panel comprising: a substrate comprising a major surface and divided into an active area and a non-active area when viewed in a viewing direction perpendicular to the major surface, a plurality of driving electrodes formed over the active area of the substrate and generally arranged along a first direction, a plurality of first sensing electrodes formed over the active area of the substrate and generally arranged along a second direction, a plurality of second sensing electrodes formed over the active area of the substrate and arranged along the second direction, wherein the shapes of the first sensing electrode and the second sensing electrode are different from each other, a plurality of driving lines formed over the non-active area of the substrate and connected to the driving electrodes, a plurality of first sensing lines formed over the non-active area of the substrate and connected to the first sensing electrodes, and a plurality of second sensing lines formed over the non-active area of the substrate and connected to the second sensing electrodes.

In the foregoing touch screen panel, the first sensing electrodes may be alternately disposed so as not to overlap the driving electrodes when viewed in the viewing direction, and wherein the second sensing electrodes are formed on a level different from that of the driving electrodes and different from that of the first sensing electrodes, wherein the second sensing electrodes are shaped and arranged so as not to overlap the driving electrodes or the first sensing electrodes when viewed in the viewing direction.

When viewed in the viewing direction, each of the second sensing electrodes may comprise a portion interposed between the driving electrode and the first sensing electrode which are immediately neighboring.

One of the second sensing electrodes may be shaped to surround the adjacent first sensing electrode when viewed in the viewing direction.

When viewed in the viewing direction, one of the second sensing electrodes may define an opening so as not to overlap the adjacent first sensing electrode.

The first sensing electrodes arranged in a column may be connected to the corresponding one of the first sensing lines formed over the non-active area of the substrate, and the second sensing electrodes arranged in the column may be connected to the corresponding one of the second sensing lines formed over the non-active area of the substrate.

A first one of the driving electrodes and one of each of the first and second sensing electrodes adjacent to the first one of the driving electrodes may be configured to form a sensing set, wherein the sensing set may include a first sensing cell including one of the driving electrodes and the adjacent first sensing electrode and a second sensing cell including the driving electrode and the adjacent second sensing electrode.

One of the driving electrodes which are arranged in a row may be electrically connected to the adjacent driving electrode in the row through a first connector, and one of the first sensing electrodes which are arranged in a column may be electrically connected to the adjacent first sensing electrode in the column through a second connector.

The driving electrodes and the first sensing electrodes may be configured to form a regular pattern.

The regular pattern may comprise an array of diamond shapes of the driving electrodes and the first sensing electrodes.

The foregoing touch screen panel may further comprise an insulation film disposed between the first connector and the second connector overlapping each other when viewed in the viewing direction.

The foregoing touch screen panel may further comprise a touch circuit unit electrically connected to the driving lines and the first and second sensing lines through a pad unit, which is formed over one side distal end of the substrate.

The touch circuit unit may include driving circuit sequentially applying the driving signals to the driving lines, a sensing circuit connected to the first and second sensing lines and configured to receive generated sensing signals by detecting a change in capacitance, and a processing unit configured to determine a touch position detected by processing the sensing signals received from the sensing circuit.

BRIEF DESCRIPTION OF THE DRAWINGS

The accompanying drawings, together with the specification, illustrate exemplary embodiments of the present

DETAILED DESCRIPTION OF EMBODIMENTS

Figure 1:
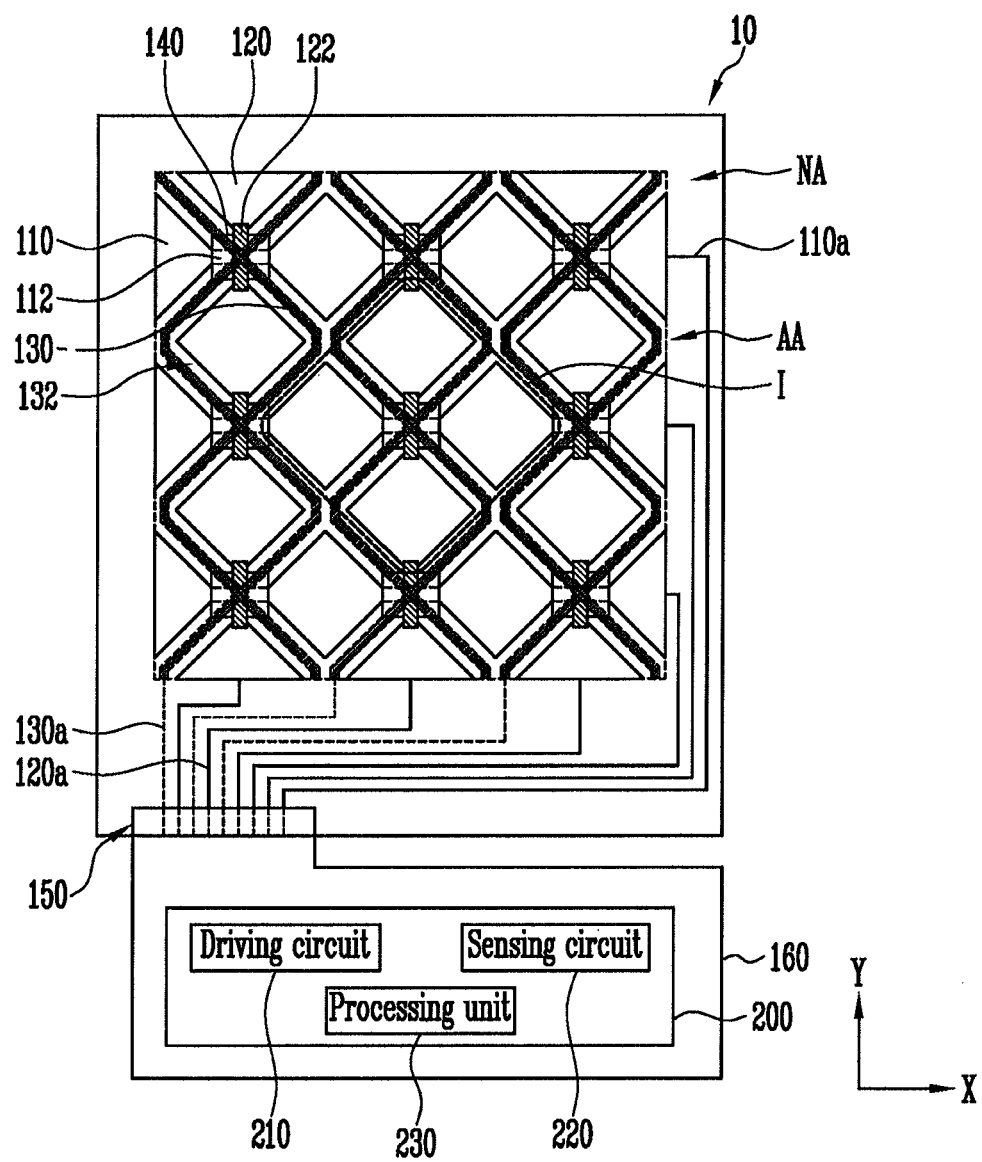
FIG. 1 is a plan view showing a configuration of a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

In an example, a capacitive type touch screen panel includes first electrodes formed in a first direction and second electrodes alternately disposed in a second direction such that the second electrodes do not overlap the first electrodes. The touch screen panel is implemented as one sensing set of one first electrode and one adjacent second electrode. When a user touches the sensing set of the first and second electrodes, the capacitive change in the first and second electrodes of the sensing set is sensed so that a touch position is recognized.

Hereinafter, embodiments of the present invention will be described in detail with reference to the accompanying drawings.

Figure 2:
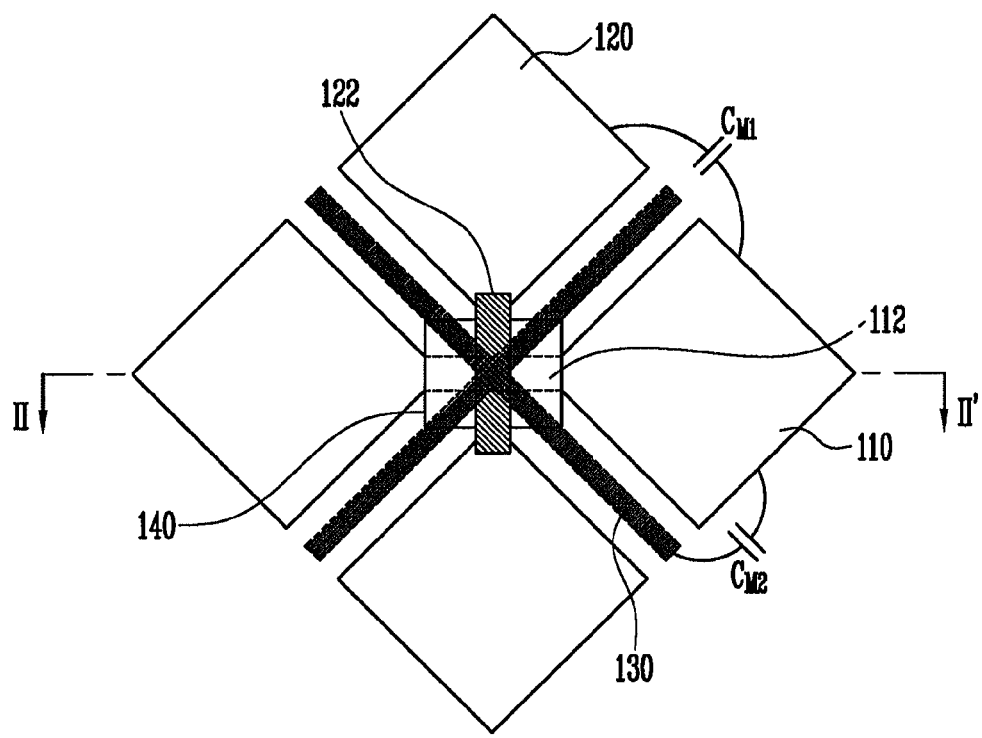
FIG. 2 is an enlarged view of a specific region I of FIG. 1.

FIG. 1 is a plan view showing a configuration of a touch screen panel according to an embodiment of the present invention, FIG. 2 is an enlarged view of a specific region I of FIG. 1.

Although electrodes arranged in three vertical and horizontal lines and trace lines connected thereto are described in FIG. 1, which is for convenience of description, the embodiment of the present invention is not limited thereto.

Referring to FIG. 1, the touch screen panel according to the exemplary embodiment of the present invention includes: a substrate 10 including a first major surface and a second major surface opposing the first major surface and divided into an active area AA and a non-active area NA when viewed in a viewing direction perpendicular to the first and second major surface, driving electrode 110 and sensing electrodes 120 and 130 formed on the active area AA of the substrate 10, and trace lines 110a, 120a, and 130a which are formed on the non-active area NA of the substrate 10 to connect the driving electrodes 110 and sensing electrodes 120 and 130 to an outside touch circuit unit 200 through a pad unit 150.

Here, the touch circuit unit 200 may be mounted on a flexible printed circuit board (FPCB) 160 connected to the pad unit 150 as described above.

That is, the substrate 10 may divided into the active area AA and the non-active area NA when viewed in the viewing direction, the active area AA for sensing a touch input is overlapped an image display area, and the non-active area NA which is positioned on a peripheral part of the active area AA and has the trace lines 110a, 120a, and 130a formed thereon. Also, the substrate may be implemented by a glass substrate or a transparent material having a flexibility, heat resistance, and chemical resistance.

Here, the material having flexibility may be a thin film type substrate which is formed of at least one material selected from a group of polyethyleneterephthalate (PET), polycarbonate (PC), Acryl, polymethylmethacrylate (PMMA), triacetylcellulose (TAC), polyethersulfone (PES) and polyimide (PI).

The touch screen panel according to the exemplary embodiment of the present invention, which is operated in a manner of a mutual capacitive type, includes the driving electrodes 110 sequentially received driving signals and the sensing electrodes 120 and 130 adjacently formed to the driving electrodes 110 to detect a change in the capacitance with the adjacent driving electrode.

More specifically, the driving electrodes 110 are arranged in a first direction (for example, X axis direction) in the active area AA, two immediately neighboring driving electrodes 110 arranged in each line (for example, a row line) are electrically connected through a connector 112.

Also, each of the driving electrodes in each line (for example, a row line) positioned on one side distal end of the active area AA is connected to driving lines 110a arranged on the non-active area NA.

The sensing electrodes 120 and 130 which are arranged in a second direction (for example, Y axis direction) intersected with the first direction, in an example, perpendicular to the first direction. The first sensing electrodes 120 have a shape substantially different from the second sensing electrodes 130.

Here, the first sensing electrodes 120 are intersected with the driving electrodes 110 so as not to overlap the driving electrodes 110 when viewed in the viewing direction. In addition, two immediately neighboring first sensing electrodes 120 which are arranged in each line (for example, a column line) are electrically connected through a connector 122.

Also, the second sensing electrodes 130 which are formed on a layer different from that of driving electrodes 110 and the first sensing electrodes 120, are implemented in a shape without overlapping the driving electrodes 110 and the first sensing electrodes 120 when viewed in the viewing direction.

That is, when viewed in the viewing direction, the second sensing electrodes 130 may be formed on a region between the driving electrodes 110 and the adjacent first sensing electrodes 120.

The driving electrodes 110 and the first and second sensing electrodes 120 and 130 may be implemented by a transparent conductive material, the transparent conductive material is formed of indium-tin-oxide (ITO), indium-zinc-oxide (IZO), carbon nano tube (CNT), or the like.

Also, the driving electrodes 110 and the first and second sensing electrodes 120 and 130 may be implemented by a flexible opaque conductive material having a mesh shape, and in this case, there are advantages of generating fewer cracks than a transparent conductive material, such as ITO, and having high conductivity.

Further, the first and second electrodes 120 and 130 in each line (column line) which are positioned on one side distal end of the active area AA are respectively connected to the first and second sensing lines 120a and 130a arranged on the non-active area NA. That is, each of the trace lines 110a, 120a, and 130a formed on the non-active area NA is the driving line 110a and the first and second sensing lines 120a and 130a, and is connected to the outside touch circuit unit 200 through the pad unit 150 illustrated in FIG. 1.

Here, the second sensing lines 130a may be formed on another layer, which is a layer different from that of the driving lines 110a and the first sensing lines 120a, that is, another surface of the substrate 10. In this case, the second sensing lines 130a may be electrically connected to the pad unit 150 through a contact hole (not illustrated) formed on the substrate 10.

The touch circuit unit 200, which is mounted on the flexible printed circuit substrate (FPCB) 160, may includes: a driving circuit 210 sequentially applying driving signals to the driving lines 110a, respectively, a sensing circuit 220 detecting a change in capacitance sensed at the first and second sensing lines 120a and 130a and received the sensed sensing signals, and a processing unit 230 determining a touch position which is detected by supplying a sensing signal from a sensing circuit 220.

Although a touch screen panel in the related art is implemented as one sensing set of a driving electrode and only one adjacent sensing electrode, an embodiment of the present invention is implemented as one sensing set of the driving electrode 110 and the adjacent sensing electrodes 120 and 130 having different shapes. Therefore, a plurality of the sensing signals to a driving signal is secured rather than the touch sensing is performed through a sensing signal to a driving signal, thereby making it possible to improve a touch recognizing sensitivity.

In the configuration in accordance with embodiments of the invention, when a user touches the touch panel, a first capacitance change between one driving electrode 110 and one first sensing electrode 120 adjacent the driving electrode 110 is sensed. At the same time, a second capacitance change between the driving electrode 110 and one second sensing electrode 130 adjacent the driving electrode 110 can be sensed as the second sensing electrode 130 extends between the driving electrode 110 and the first sensing electrode 120 as shown in FIG. 2. Such simultaneous sensing of the two capacitance change can increase the sensitivity of the touch panel.

In the embodiment described in FIGS. 1 and 2, a case in which the sensing electrodes implemented as one sensing set with one driving electrode is implemented as two, that is, a first and a second sensing electrodes, will be described with examples.

That is, the sensing set according to the exemplary embodiment of the present invention includes a first sensing cell which is configured of one driving electrode and an adjacent the first sensing electrode and a second sensing cell which is configured with the driving electrode and the adjacent second sensing cell. Hereinafter, the exemplary embodiment of the present invention will be described in detail with reference to FIGS. 1 and 2.

First, a configuration and operation of the first sensing cell configured of the driving electrode 110 and the adjacent first sensing cell 120 will be described.

The driving electrodes 110 and the first sensing electrodes 120 are alternately disposed not to overlap with each other.

For example, as described above, the driving electrodes 110 and the first sensing electrodes 120 may be arranged to be adjacent in a regular pattern, such as an array of diamond shape electrodes. However, that is one example, the shapes of electrodes are not limited to a diamond shape.

Also, in the case in which the driving electrodes 110 and the first sensing electrodes 120 are formed on a same layer or a same level, a short circuit is generated between the connectors 112 and 122 corresponding to a intersection between the driving electrodes 110 and the first sensing electrodes 120. Therefore, one of the intersected connector is implemented in a bridge shape which is formed on another layer. That is, an insulating film 140 is formed on the intersection part, the connector 122 having a bridge shape is formed on the insulating film 140.

Referring to FIG. 2, according to embodiments of the present invention, the connectors 122 connecting the first sensing electrodes are implemented in a bridge shape, and the insulating film 140 having an island shape is formed between the connectors 112 and 122.

However, that is one example, the shapes of electrodes are not limited thereto.

That is, the driving electrodes 110 and the first sensing electrodes 120 may be formed on each layer which is different from each other. For example, the driving electrodes 110 and the connectors are formed on the substrate 10, the insulating film is formed on front surfaces of the driving electrodes 110 and the connectors 112, and the first sensing electrodes 120 and the connectors 112 thereof may be formed on the insulating film. In this case, a separate connector having a bridge shape would not be required.

Otherwise, the driving electrodes 110 and the first sensing electrodes 120 are formed on a separate substrate, respectively, and may be implemented in a structure in which the substrates are attached to each other through transparent adhesive.

A first mutual capacitance CM1 is formed between the adjacent driving electrode 110 and the first sensing electrode 120 intersected with each other by an arrangement of the driving electrodes 110 and the first sensing electrodes 120 as described above, and each of the driving electrodes 110 and the first sensing electrodes 120 including the first mutual capacitance CM1 serves as the first sensing cell implementing a touch recognizing.

However, the first mutual capacitance CM1 generated in the first sensing cell generates a coupled sensing signal to the first sensing line 120a connected to the first sensing electrode 120 which is included in the first sensing cell, in the case in which the driving signal from the driving circuit 210 included in the touch circuit unit 200 is applied to the driving line 110a connected to the driving electrode 110 which is included in the first sensing cell.

That is, the first mutual capacitance CM1 generated in each first sensing cell is sensed through the first sensing line 120a connected to each of the first sensing cells when a driving signals applied to the driving line 110a connected to each first sensing cell.

Also, the driving circuit 120 sequentially supplies the driving signals to each driving line. Therefore, when the driving circuit 120 supplies the driving signals to any one of the driving lines, the other driving lines maintain a ground state.

Accordingly, the driving electrodes 110 connected to the driving line in which the driving signal is applied to and the first sensing electrodes 120 adjacently intersected the driving electrodes configures each of the first sensing cells to form a first mutual capacitance CM1 by each the first sensing cell.

Next, a configuration and operation of the second sensing cell configured with the driving electrode 110 and the adjacent second sensing cell 130 will be described.

In addition, the second sensing electrodes 130 which are formed on a layer different from the driving electrodes 110 and the first sensing electrodes 120 are implemented in a shape which does not overlap the driving electrodes 110 and the first sensing electrodes 120.

For example, the second sensing electrodes 130 may be formed on a region between the driving electrodes 110 and the adjacent first sensing electrodes 120.

That is, a case of the exemplary embodiment illustrated in FIG. 1, the second sensing electrode 130 is implemented as a shape in which the adjacent first sensing electrode 120 is surrounded, therefore, the center region of the second sensing electrode 130 has an opening 132 such that the second sensing electrode 130 does not overlap the first sensing electrode 120. However, that is one example, the shapes of the second sensing electrodes 130 are not limited thereto.

Also, the second sensing electrodes 130 may be formed on a layer different from that of the driving electrodes 110 and the adjacent first sensing electrodes 120.

Figure 3A:
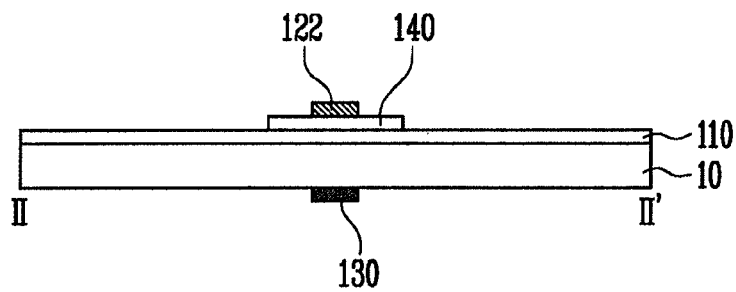
FIGS. 3A and 3B are cross-sectional views of a region taken along a line II-II' of FIG. 2 according to an embodiment of the present invention.
Figure 3B:
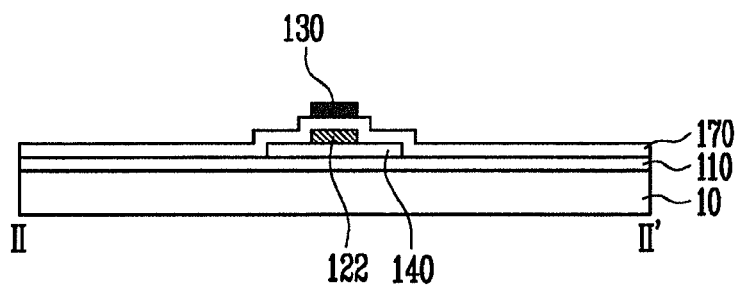

FIGS. 3A and 3B are cross-sectional views of a region taken along a line of FIG. 2 according to an embodiment of the present invention. The exemplary embodiment illustrated in FIG. 3A shows that the driving electrodes 110 and the first sensing electrodes 120 are formed on a first surface of the substrate 10 and the second sensing electrodes 130 are formed on a second surface of the substrate 10.

Also, the exemplary embodiment of the present invention illustrated in FIG. 3B shows that the insulating film 170 is formed on the first surface of the substrate 10 including the driving electrodes 110 and the first sensing electrodes 120 and the second sensing electrodes 130 are formed on the insulating film 170.

Otherwise, the second sensing electrodes 130 are formed on a separate substrate (not illustrated) rather than the substrate 10, and may be implemented in a structure in which the substrates are attached to each other through a transparent adhesive.

A second mutual capacitance CM2 is formed between the adjacent driving electrode 110 and the second sensing electrode 130 by an arrangement of the driving electrodes 110 and the second sensing electrodes 130 as described above, and each of the driving electrodes 110 and the second sensing electrodes 130 including the second mutual capacitance CM2 serves as the second sensing cell implementing touch recognition.

However, the second mutual capacitance CM2 generated in the second sensing cell generates a coupled sensing signal to the second sensing line 130a connected to the second sensing electrode 130 which is included in the second sensing cell, when the driving signal from the driving circuit 210 is applied to the driving line 110a connected to the driving electrode 110 which is included in the second sensing cell.

That is, the second mutual capacitance CM2 generated in each second sensing cell is sensed through one of the second sensing lines 130a connected to one of the second sensing electrodes when a driving signal is applied to the driving line 110a connected to one of the driving electrodes.

Also, the driving circuit 120 sequentially supplies the driving signals to each driving line. Therefore, when the driving circuit 120 supplies the driving signals to any one of the driving lines, the other driving lines maintain a ground state.

Accordingly, the driving electrodes 110 connected to the driving line in which the driving signal is applied to and the first sensing electrodes 130 adjacently intersected with the driving electrodes configures each of the second sensing cells to form the second mutual capacitance CM2 by each the second sensing cell.

Figure 4:
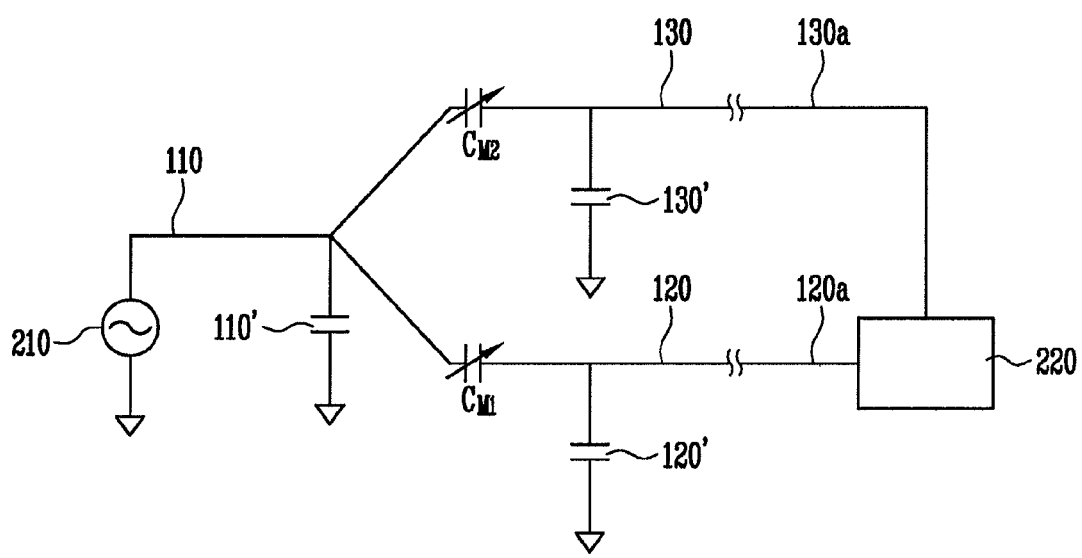
FIG. 4 is a circuit diagram schematically showing a sensing set of a touch screen panel according to an embodiment of the present invention.

FIG. 4 is a circuit diagram schematically showing a sensing set of a touch screen panel according to an embodiment of the present invention.

Referring to FIG. 4, a sensing set of the touch screen panel according to embodiments of the present invention may be described as a mutual capacitive circuit, and includes the driving electrode 110 connected to the driving line 110a and the first and second sensing electrodes 120 and 130 respectively connected to the first and second sensing lines 120a and 130a, in addition, they are spatially separated so that a capacitive coupling node is formed, that is, the first and second sensing cells.

Here, the driving line 110a is connected to the driving circuit 210 described as a voltage source, and the first and second sensing lines 120a and 130a are connected to the sensing circuit 220.

Also, each of the driving electrodes 110 and the first and second sensing electrodes 120 and 130 may include a predetermined parasitic capacitance 110', 120', and 130'.

As described above, the driving electrode 110 and the adjacent first and second sensing electrodes 120 and 130 intersected therewith are implemented as one sensing set including each of the first and second sensing cells. When a conductive object (such as, finger) approaching the sensing set is not presented, the first and second mutual capacitances CM1 and CM2 generated in the sensing set do not change. However, when the conductive object is approached or contacted the sensing set, the first and second mutual capacitances CM1 and CM2 generated in the sensing set change, thereby making it possible to change current (and/or voltage) applied to the first and second sensing lines 120a and 130a connected to the sensing set.

The sensing circuit 200 connected to first and second sensing lines 120a and 130a converts information (sensing signals) about a change in the capacitance and a position of the sensing set into a predetermined form through a ADC (not shown) and then transmits to a processing unit (230 of FIG. 1).

A method of detecting a position of the sensing set which a change in capacitance is generated according to the exemplary embodiment of the present invention will be described.

When the sensing circuit 220 senses changes in capacitances of the first and second sensing lines 120a and 130a connected to the sensing set, coordinates of the first and second sensing lines 120a and 130a which a change in capacitance is generated and coordinates of the first and second sensing electrodes 120 and 130 including the sensing set which is connected the driving line 110a are output so that at least one coordinate of the sensing set where contact is performed is obtained.

As described above, the sensing circuit 220 is implemented by connecting through the driving circuit 210 and lines (not illustrated). Therefore, the driving circuit 210 constantly outputs scanned coordinates of the sensing circuit 220 while scanning (sequentially applying the driving signals) the driving lines 110a, such that the sensing circuit 220 may sense change in capacitance of the first and second sensing lines 120a and 130a, and may obtain a position coordinates of the first and second sensing lines 120 and 130 configuring a sensing set, that is, a position where the capacitance is changed.

According to the exemplary embodiment of the present invention, a plurality of the sensing signals to a driving signal is secured and then allows the touch recognizing sensitivity to be improved, rather than touch is sensed through a sensing signal to a driving signal, due to a configuration of the sensing set including the first sensing cell which includes one driving electrode 110 and the adjacent first sensing electrode 120 and the second sensing cell which includes the driving electrode 110 and the adjacent second sensing electrode 130.

As set forth above, a touch screen panel includes the driving electrodes arranged in the first direction and a plurality of the sensing electrodes arranged in a second direction in which it is intersected with the first direction and formed in shape different from each other, and is implemented as a sensing set of the driving electrode and the adjacent sensing electrodes having a shape different from each other. Therefore, a plurality of the sensing signals to a driving signal is secured, rather than touch is sensed through a sensing signal to a driving signal, thereby making it possible to improve the touch recognizing sensitivity.

While embodiments of the present invention have been described in connection, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
a substrate comprising a major surface and divided into an active area and a non-active area when viewed in a viewing direction perpendicular to the major surface;
a plurality of driving electrodes formed over the active area of the substrate;
a plurality of first sensing electrodes formed over the active area of the substrate;
an insulation film on the substrate to cover the driving electrodes and the first sensing electrodes; and
a plurality of second sensing electrodes formed on the insulation film so that the first sensing electrode and the second sensing electrode are formed on a different level, the second sensing electrode formed over the active area of the substrate and arranged along the second direction,
wherein each driving electrode comprises a plurality of driving electrode pads that are electrically connected in series and arranged generally along a first direction,
wherein each first sensing electrode comprises a plurality of sensing electrode pads that are electrically connected in series,
wherein each second sensing electrode comprises a plurality of closed-loop sensing segments that are electrically connected in series, each closed-loop sensing segment surrounding one of the plurality of sensing electrode pads,
wherein the plurality of sensing electrode pads extend along a second direction perpendicular to the first direction, and the plurality of closed-loop sensing segments extend along the second direction together with the plurality of sensing electrode pads; and
an insulator is formed on the substrate so as to be interposed between the second sensing electrodes and an interconnection between the first sensing electrodes.

2. The touch screen panel according to claim 1,
wherein the sensing electrode pads of the first sensing electrodes do not overlap the driving electrode pads of the driving electrodes when viewed in the viewing direction, and
wherein the closed-loop sensing segments of the second sensing electrodes do not overlap the driving electrode pads of the driving electrodes or the sensing electrode pads of the first sensing electrodes when viewed in the viewing direction.

3. The touch screen panel according to claim 1,
wherein, when viewed in the viewing direction, each of the second sensing electrodes comprises a portion interposed between one of the plurality of driving electrode pads and one of the plurality of sensing electrode pads which are immediately neighboring with each other.

4. The touch screen panel according to claim 1,
wherein each closed-loop sensing segment is shaped to surround one of the plurality of sensing electrode pads when viewed in the viewing direction.

5. The touch screen panel according to claim 1, further comprising:
a plurality of first sensing lines formed over the non-active area of the substrate and connected to the plurality of first sensing electrodes respectively, and
a plurality of second sensing lines formed over the non-active area of the substrate and connected to the plurality of second sensing electrodes respectively.

6. The touch screen panel according to claim 1,
wherein one of the driving electrodes, one of the first sensing electrodes, and one of the second sensing electrodes form a sensing set,
wherein the sensing set includes a first sensing cell and a second sensing cell, the first sensing cell comprising one of the driving electrode pads and one of the first sensing electrode pads, the second sensing cell comprising the one driving electrode pad and one of the closed-loop segments.

7. The touch screen panel according to claim 1,
wherein two immediately neighboring driving electrode pads of one of the driving electrodes are electrically connected by a first connector generally extending along the first direction,
wherein two immediately neighboring sensing electrode pads of one of the first sending electrodes are electrically connected by a second connector generally extending along the second direction.

8. The touch screen panel according to claim 7, wherein the driving electrodes and the first sensing electrodes form a repeated pattern.

9. The touch screen panel according to claim 1,
wherein the plurality of driving electrodes provide an array of diamond shaped driving electrode pads.

10. The touch screen panel according to claim 7,
further comprising an insulation film disposed between the first connector and the second connector that are overlapping each other when viewed in the viewing direction.

11. The touch screen panel according to claim 1, further comprising a touch circuit unit electrically connected to the driving electrodes, the first sensing electrodes and the second sensing electrodes through a pad unit, which is formed over one side distal end of the substrate.

12. The touch screen panel according to claim 11, wherein the touch circuit unit includes:
a driving circuit configured to sequentially apply driving signals to the driving electrodes,
a sensing circuit connected to the first and second sensing electrodes and configured to receive sensing signals generated in response to a change in capacitance, and
a processing unit configured to determine a touch position based on the sensing signals.

13. The touch screen panel according to claim 1, further comprising:
a plurality of driving lines formed over the non-active area of the substrate and connected to the plurality of driving electrodes;
a plurality of first sensing lines formed over the non-active area of the substrate and connected to the plurality of first sensing electrodes; and
a plurality of second sensing lines formed over the non-active area of the substrate and connected to the plurality of second sensing electrodes.

14. The touch screen panel according to claim 7, wherein the first connector and the second connector are formed at different levels in the viewing direction.

15. The touch screen panel according to claim 1, wherein, when viewed in the viewing direction, none of the driving electrode pads are surrounded by a closed-loop segment of the second sensing electrodes.

16. A touch screen panel comprising:
a substrate comprising a major surface and divided into an active area and a non-active area when viewed in a viewing direction perpendicular to the major surface;
a plurality of driving electrodes formed over the active area of the substrate;
a plurality of first sensing electrodes formed over the active area of the substrate;
an insulation film on the substrate to cover the driving electrodes and the first sensing electrodes;
a plurality of second sensing electrodes formed on the insulation film so that the first sensing electrode and the second sensing electrode are formed on a different level, the second sensing electrode formed over the active area of the substrate and arranged along the second direction;
a plurality of first sensing lines formed over the non-active area of the substrate; and
a plurality of second sensing lines formed over the non-active area of the substrate,
wherein each driving electrode comprises a plurality of driving electrode pads that are electrically connected in series and arranged generally along a first direction,
wherein each first sensing electrode comprises a plurality of sensing electrode pads that are electrically connected in series,
wherein each second sensing electrode comprises a plurality of closed-loop sensing segments that are electrically connected in series, each closed-loop sensing segment surrounding one of the plurality of sensing electrode pads,
wherein the plurality of sensing electrode pads extend along a second direction perpendicular to the first direction, and the plurality of closed-loop sensing segments extend along the second direction together with the plurality of sensing electrode pads,
wherein each first sensing electrode is electrically connected to one of the first sensing lines, and
wherein each second sensing electrode is electrically connected to one of the second sensing lines.

* * * * *